(12) United States Patent
Kubokawa et al.

(10) Patent No.: US 6,955,702 B2
(45) Date of Patent: Oct. 18, 2005

(54) FILTER FRAME

(75) Inventors: James O. Kubokawa, Saint Paul, MN (US); Ben G. Rogowski, Richfield, MN (US); Thomas A. Tedham, Eden Prairie, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 263 days.

(21) Appl. No.: 10/172,606

(22) Filed: Jun. 14, 2002

(65) Prior Publication Data

US 2003/0230063 A1 Dec. 18, 2003

(51) Int. Cl.[7] .......................... B01D 46/10; B01D 46/52
(52) U.S. Cl. ........................ 55/499; 55/500; 55/501; 55/521; 55/357; 55/DIG. 31
(58) Field of Search .................... 55/495, 497, 499, 55/500, 501, 503, 521, 356, 357, DIG. 31

(56) References Cited

U.S. PATENT DOCUMENTS

| | | | |
|---|---|---|---|
| 2,074,294 A | * | 3/1937 | Woodruff ..................... 55/499 |
| 2,130,107 A | | 9/1938 | Somers |
| 2,423,741 A | | 7/1947 | Vokes et al. |
| 2,479,722 A | * | 8/1949 | Brixius ........................ 55/499 |
| 2,739,667 A | * | 3/1956 | Palmore ...................... 55/499 |
| 3,183,286 A | | 5/1965 | Harms |
| 3,187,489 A | | 6/1965 | Bauder et al. |
| 3,234,717 A | * | 2/1966 | Korn ........................... 55/499 |
| 3,280,984 A | | 10/1966 | Sexton et al. |
| 3,373,546 A | | 3/1968 | Setnan |
| 3,494,113 A | | 2/1970 | Kinney |
| 3,624,161 A | | 11/1971 | Bub |
| 3,712,033 A | | 1/1973 | Gronholz |
| 3,774,377 A | | 11/1973 | Bishop |
| 3,789,589 A | | 2/1974 | Delany et al. |
| 4,042,358 A | | 8/1977 | Frohmader |
| 4,135,900 A | | 1/1979 | Westlin et al. |
| 4,334,899 A | * | 6/1982 | McConnell ............ 55/DIG. 31 |
| 4,363,643 A | * | 12/1982 | Elbrader et al. ............... 55/499 |
| 4,449,993 A | * | 5/1984 | Bergeron ............... 55/DIG. 31 |
| 4,547,950 A | * | 10/1985 | Thompson ................... 55/499 |
| 4,549,887 A | | 10/1985 | Joannou |
| 4,617,122 A | | 10/1986 | Kruse et al. |
| 4,701,196 A | | 10/1987 | Delany |
| 4,756,728 A | | 7/1988 | Conrad |
| 4,762,053 A | | 8/1988 | Wolfert |
| 4,978,375 A | | 12/1990 | Il Yoo |
| 4,999,038 A | | 3/1991 | Lundberg |
| 5,015,377 A | | 5/1991 | Silvera |
| 5,059,218 A | | 10/1991 | Pick |
| 5,075,000 A | | 12/1991 | Bernard et al. |
| 5,108,470 A | | 4/1992 | Pick |
| 5,133,789 A | * | 7/1992 | Smith .......................... 55/511 |
| 5,217,513 A | | 6/1993 | Armbruster |
| 5,252,111 A | | 10/1993 | Spencer et al. |
| 5,273,563 A | | 12/1993 | Pasch et al. |
| 5,273,564 A | | 12/1993 | Hill |
| 5,399,180 A | | 3/1995 | Kopp |

(Continued)

FOREIGN PATENT DOCUMENTS

| | | |
|---|---|---|
| CA | 1011265 | 5/1977 |
| CA | 1073826 | 3/1980 |
| JP | 4-131112 | 5/1992 |
| JP | 9-287811 | 11/1997 |
| JP | 2001062232 | 3/2001 |

*Primary Examiner*—Duane Smith
*Assistant Examiner*—Jason M. Greene
(74) *Attorney, Agent, or Firm*—David B. Patchett

(57) ABSTRACT

A reusable filter frame adapted to receive a replaceable filter element includes a base and a cover connected with the base. The base includes a plurality of longitudinal rails and a plurality of transverse ribs for supporting and spacing the filter element. The filter frame also includes a securing mechanism for securing the filter element to the frame and maintaining the filter element in its expanded condition.

6 Claims, 4 Drawing Sheets

U.S. PATENT DOCUMENTS

| | | | | |
|---|---|---|---|---|
| 5,458,772 A | * | 10/1995 | Eskes et al. | 55/DIG. 31 |
| 5,464,461 A | | 11/1995 | Whitson et al. | |
| 5,505,852 A | | 4/1996 | van Rossen | |
| 5,571,300 A | | 11/1996 | Stemmer | |
| 5,595,107 A | | 1/1997 | Bivens | |
| 5,613,991 A | | 3/1997 | Esaki et al. | |
| 5,618,324 A | | 4/1997 | Sommer et al. | |
| 5,639,287 A | | 6/1997 | Van de Graaf et al. | |
| 5,743,927 A | | 4/1998 | Osendorf | |
| 5,779,747 A | | 7/1998 | Schlör et al. | |
| 5,792,228 A | | 8/1998 | Fath et al. | |
| 5,809,800 A | | 9/1998 | Deal | |
| 5,814,219 A | | 9/1998 | Friedmann et al. | |
| 5,820,644 A | | 10/1998 | Mori et al. | |
| 5,840,094 A | | 11/1998 | Osendorf et al. | |
| 5,846,302 A | | 12/1998 | Putro | |
| 5,958,097 A | | 9/1999 | Schlör et al. | |
| 5,968,217 A | | 10/1999 | Stein et al. | |
| 6,030,427 A | | 2/2000 | Sorice et al. | |
| 6,033,453 A | | 3/2000 | Weddell, III | |
| 6,059,852 A | | 5/2000 | Olson | |
| 6,074,450 A | * | 6/2000 | Raber | 55/499 |
| 6,179,891 B1 | | 1/2001 | Knudsen et al. | |
| 6,328,778 B1 | | 12/2001 | Richerson et al. | |
| 6,599,343 B2 | * | 7/2003 | Fredrick et al. | 55/499 |
| 2002/0020156 A1 | | 2/2002 | Goerg | |
| 2002/0166312 A1 | * | 11/2002 | Phelps | 55/497 |

* cited by examiner

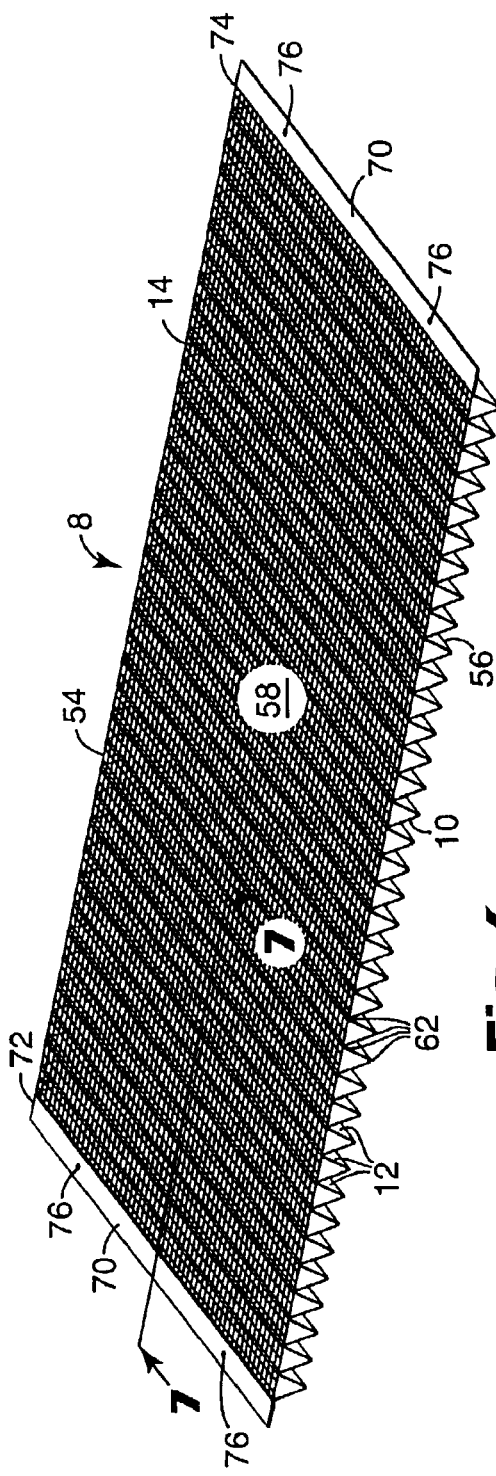
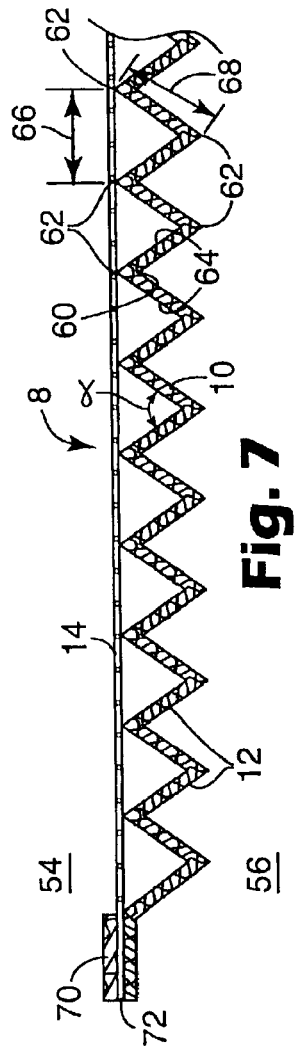
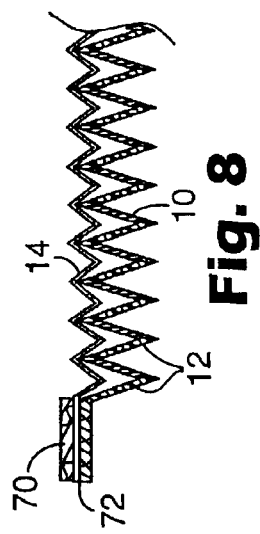

FILTER FRAME

FIELD OF THE INVENTION

The present invention relates generally to filters and, more particularly, to an air filter including a reusable frame and a collapsible, replaceable, pleated filter element.

BACKGROUND OF THE INVENTION

Many conventional residential heating and cooling systems include a disposable filter. These filters typically include a frame, a filter material formed of glass fibers or similar material, and a mesh screen or the like that supports the filter material. After a period of use, these filters become dirty or clogged and must be replaced. This is accomplished by replacing the entire filter assembly with a new filter and discarding the old one. Depending on the use of the filter, replacement may be required several times a year. Because the frame and screen are discarded with the assembly even though it is only the filter material that is no longer functional, there is unnecessary waste and cost associated with such filters. In addition, because these filters are rather bulky, they are often purchased as they are needed rather than keeping a large supply on hand. Because purchasing a new filter is not always convenient, replacement can be delayed resulting in reduced efficiency of the system.

Filter assemblies with frames and removable filter elements are known in the prior art. U.S. Pat. No. 3,280,984 (Sexton et al.), for example, discloses a filter assembly comprising a support frame including upstream and downstream grid retaining panels and a flat pad of filter medium disposed in the frame.

U.S. Pat. No. 3,774,377 (Bishop) discloses a filter assembly with a replaceable filter element including a frame, a disposable and replaceable filter medium, and means for retaining the filter medium in a fixed position in the frame.

U.S. Pat. No. 3,789,589 (Delany et al.) discloses a filter assembly including a casing and a drawer arranged in the casing that contains pleated filter media. The drawer includes a plurality of comb-like assemblies having pointed fingers that are disposed in the pockets of the pleated filter media to prevent the filter from collapsing. The filter includes strips extending across each end portion of the downstream side of the filter so the side edges of the downstream folds will be equally spaced.

U.S. Pat. No. 4,042,358 (Frohmader) discloses an air filter formed into an accordion-shaped body having reverse folds forming pockets. The filter includes a string-like pleat spacing member that passes through a series of openings in the pleat walls. The spacing member is intended to equally space the pleats when the filter is in its expanded condition.

U.S. Pat. No. 5,840,094 (Osendorf et al.) discloses a filter assembly including first and second frame members, a filter element, and separate comb-like spacers for retaining the filter pleats in an open spaced manner.

U.S. Pat. No. 6,033,453 (Weddell, III) discloses a reusable frame support rack for supporting and retaining an outstretched, replaceable pleated media filter core. The frame includes a pair of longitudinal angles extending between a pair of transverse angles which carry a flat expanded metal support or reinforcement system.

There remains a need, however, for a reusable filter frame adapted to receive a collapsible removable pleated filter element that provides spacing and distributed support for the pleated filter but allows the filter element to be quickly and easily replaced.

It would therefore be desirable to provide a reusable frame for use with a collapsible replaceable pleated filter element that provides spacing and distributed support for the pleated filter and allows the filter element to be quickly and easily inserted into and removed from the frame.

SUMMARY OF THE INVENTION

The present invention provides a reusable filter frame for use with a replaceable pleated filter element. In one embodiment, the frame includes a base having a perimeter structure and a plurality of transverse ribs connected with the perimeter structure adapted to mesh with and support the filter pleats. The frame optionally includes a securing mechanism for attaching the filter element to the frame and retaining the filter element in its expanded condition.

In a preferred embodiment, the frame further includes at least one longitudinal rail connected with the perimeter structure which is arranged perpendicular to the ribs. The frame also preferably includes a cover connected with the base that contains an opening to allow air to flow through the filter element. The cover is movable between an open position that allows the filter element to be inserted into or removed from the frame, and a closed position that encloses the filter media and retains it within the frame. The cover is preferably pivotally connected with the base. In one aspect, when the frame is closed, the ends of the filter element are pinched between the base and the cover, thereby securing the filter element in the frame.

In another aspect of the invention, the number of ribs generally corresponds to the number of upstream or downstream pleat openings in the filter element, whereby a rib is provided in each downstream pleat opening, and the ribs mesh with the pleats in the filter element. The ribs are preferably equally spaced to provide equal spacing for the pleats.

In a specific embodiment, the longitudinal rail includes spacer portions corresponding to the shape of the filter pleats in the region of each rib. The spacer portions may, for example, have a triangular shape with a base along the rail and an apex attached with a corresponding rib. Other shapes may also be provided.

In another embodiment, the longitudinal rail and transverse ribs form a unitary grid structure. In another embodiment, the base and cover include a latch to releasably connect the base and cover, and thereby maintain the frame in its closed condition.

In another specific embodiment, the frame is for a residential air filter and has a depth of less than 2 inches, preferably less than 1 inch, has a width of less than 40 inches, preferably less than 30 inches, and has a height of less than 30 inches, preferably less than 25 inches.

In another aspect of the invention, the perimeter structure contains indentations or narrow regions that allow the frame to be readily manually grasped by a user, thereby facilitating the installation and removal of the frame from an air duct, but do not allow air to directly bypass the filter media.

In another specific embodiment, the present invention provides a reusable frame for a residential heating and cooling system adapted to receive a replaceable, reversibly collapsible and expandable pleated filter element that includes a base having a plurality of longitudinal rails and a plurality of transverse ribs adapted to mesh with and uniformly support corresponding filter pleats, and a cover hingably connected with the base. The cover contains an opening for allowing air to flow through the filter element, and the frame includes a securing mechanism for attaching the filter media to the frame and retaining the filter media in its expanded condition and a closure for maintaining the frame in a closed condition.

BRIEF DESCRIPTION OF THE DRAWINGS

The present invention will be further described with reference to the accompanying drawings, in which:

FIG. 6 is a perspective view of a filter element in its fully expanded condition;

FIG. 7 is a sectional view taken along line 7—7 of FIG. 6; and

FIG. 8 is a sectional side view of the filter element in a partially collapsed condition.

DETAILED DESCRIPTION

Figure 1:
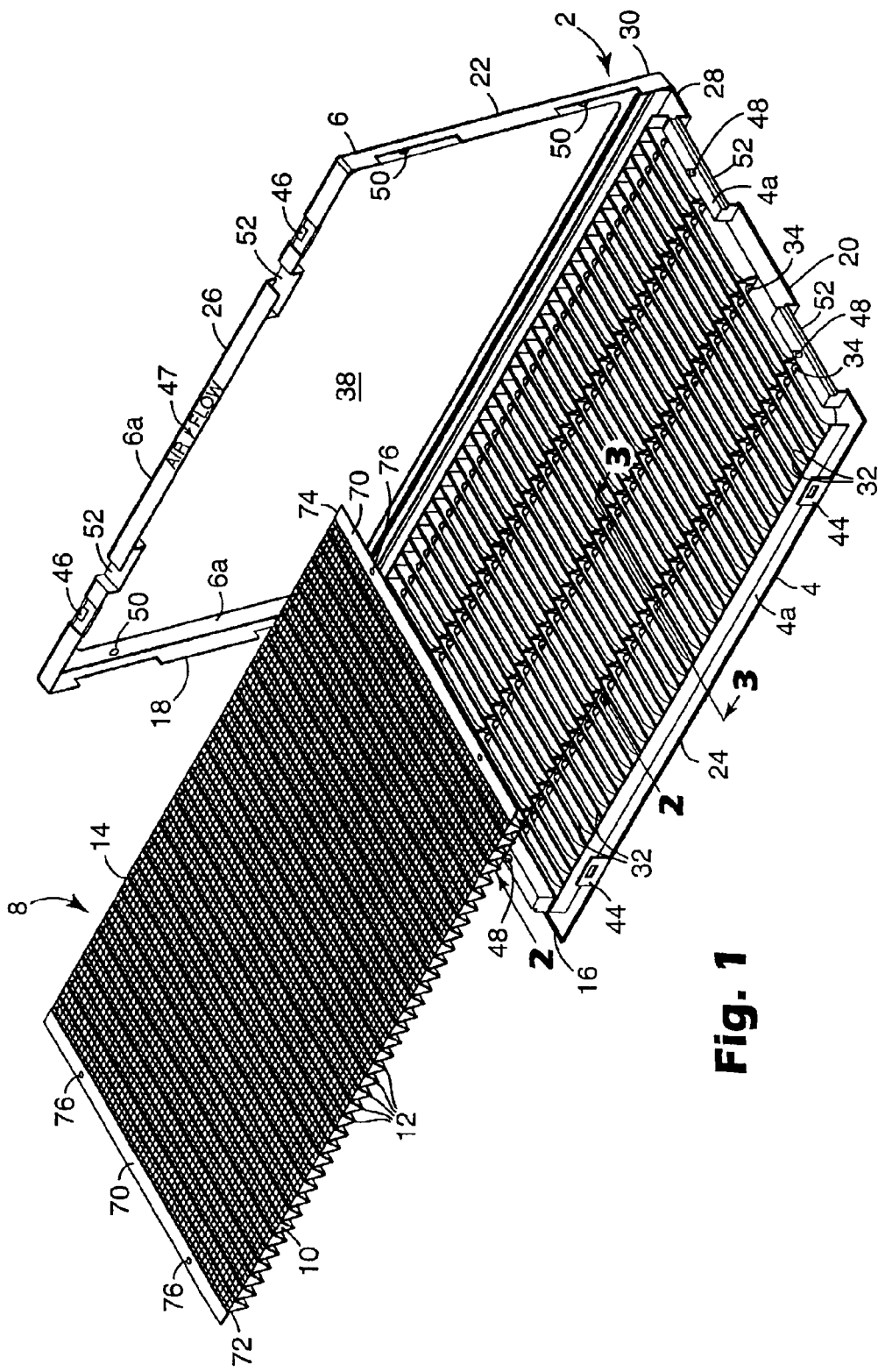
FIG. 1 is a perspective view showing a reusable filter frame according to the invention with a replaceable filter element.
Figure 2:
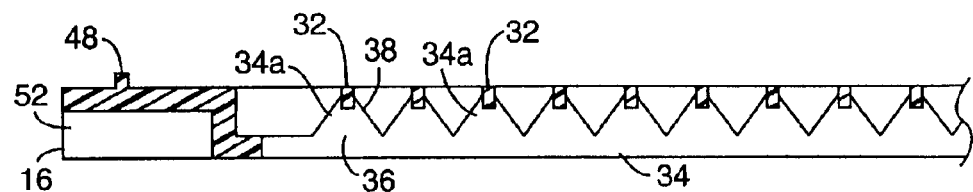
FIG. 2 is a sectional view taken along line 2—2 of FIG. 1.
Figure 3:
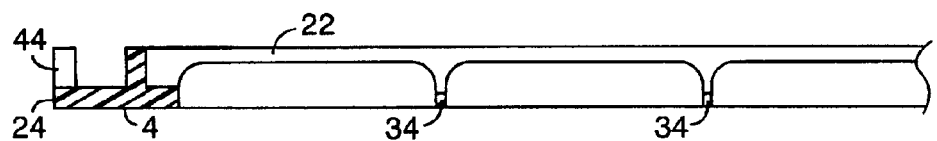
FIG. 3 is a sectional view taken along line 3—3 of FIG. 1.
Figure 5:
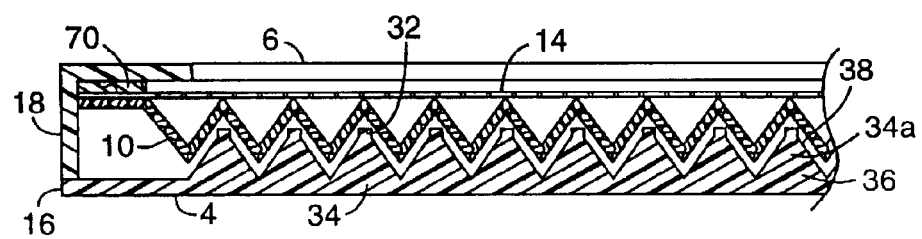
FIG. 5 is a sectional view taken along line 5—5 of FIG. 4.
Figure 4:
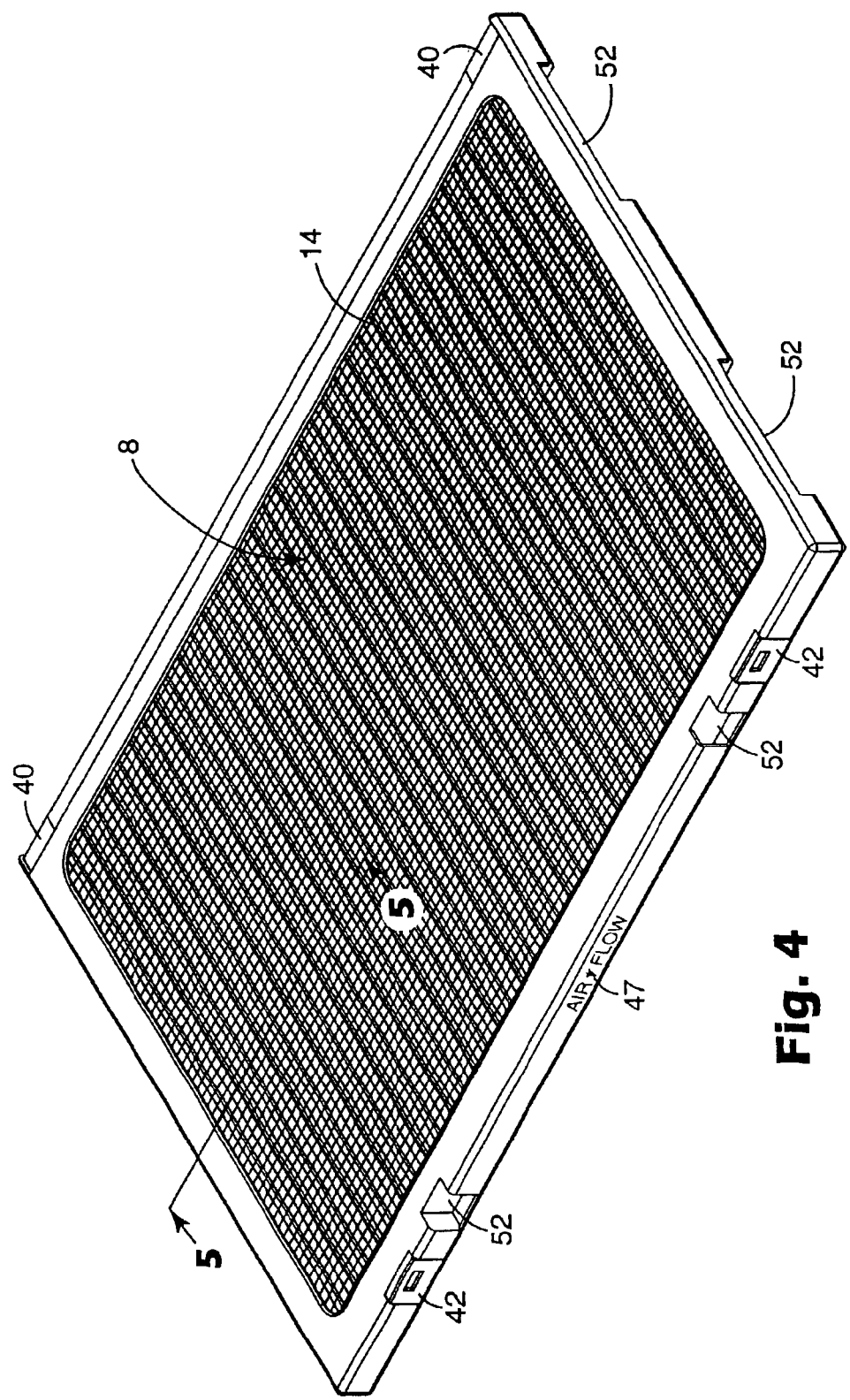
FIG. 4 is a perspective view showing the filter frame in its closed condition with a filter element installed in the frame.

Referring now to the drawings, wherein like reference numerals refer to like or corresponding parts throughout the several views, FIGS. 1–5 show a reusable filter frame 2 including a base 4 and an optional cover 6 for use with a removable pleated filter element 8 having an appropriate size and configuration to fit into the base 4. Alternatively, the filter element 8 may be arranged in the cover 6 which is then closed over the base 4. The filter frame 2 has a generally planar rectangular configuration and intended for use in an air duct of a residential air handling system, such as a furnace.

The filter element 8 generally includes filter media 10 having a plurality of pleats 12 and a spacing structure 14 attached to successive pleat tips. The filter element 8 is described more fully below with reference to FIGS. 6–8.

The base 4 and cover 6 include perimeter structures 4a, 6a, respectively, having corresponding first ends 16, 18 and second ends 20, 22, respectively, and first sides 24, 26 and second sides 28, 30, respectively. The perimeter structure of the base 4a and/or cover 6a may optionally include an edge portion (not shown) extending inwardly from the perimeter structure that provides a sealing surface for the side edges of filter element and thereby prevents air from bypassing the filter element. Such an edge portion may have a zigzagged configuration that follows the contour of the pleated filter element and therefore provides a closer fit therewith.

A plurality of equally spaced transverse ribs 32 extend from the first side 24 of the base 4 to the second side 28 of the base 4 that mesh with the pleats 12 and thereby uniformly support the filter media 10 across the entire width of the filter element 8 and provide uniform spacing of the pleats 12. To provide complete and uniform spacing of each pleat 12, the ribs 32 are preferably continuous and have a uniform height. In addition, the number of ribs 32 is preferably corresponds to the number of pleats 12 on the downstream side of the filter element 8 so that one rib 32 is arranged in each downstream pleat opening. The ribs 32 may be molded with the perimeter structure 4a of the base 4 or they may be wires, dowels, or other members that are attached to the perimeter structure 4a of the base 4.

The base 4 also optionally includes a plurality of longitudinal rails 34 extending from the first end 16 to the second end 20 that combine with the transverse ribs 32 to form a grid structure. The ribs 32 and rails 34 can be formed as separate members or as a unitary structure. The rails 34 are shown with optional triangularly-shaped spacer portions 34a that generally follow the contour of the filter pleats 12, thereby providing spacing for the pleats 12 along the entire depth of the pleat face. Each spacer portion 34a includes a base 36 along the rail 34 and an apex 38 adjacent a corresponding rib 32. The ribs 32 and rails 34 are preferably formed of a synthetic plastic material such as ABS (acrylonitrile butadiene styrene) or HIPS (high impact polystyrene) but may also be formed of other conventional materials such as wire or flat metal fins.

The cover 6 contains a central opening 38 that allows air to flow through the frame 2 to the filter element 8 so that contaminants can be removed from the air stream. The cover 6 inter-engages the periphery of the base 4 to securely retain the filter element 8 in the frame 2 and to prevent air from flowing around the filter element 8. The base 4 and cover 6 are pivotally connected along their second sides 28, 30, respectively, via hinge members 40 (FIG. 4) in the form of flexible straps. Other conventional hinges may also be used. In this manner, the frame 2 is movable between an open condition (FIG. 1) wherein the base 4 and cover 6 first side edges 24, 26, respectively, are displaced to allow the filter element 8 to be installed in or removed from the frame 2, and a closed condition (FIG. 4) wherein the base 4 and cover 6 first side edges 24, 26 respectively, are engaged to enclose the filter element 8 in the frame 2. It will be recognized that any conventional hinge may be used to connect the base 4 with the cover 6. Alternatively, the frame 2 may have a single-piece unitary construction wherein the base 4 and cover 6 are joined by a living hinge, formed, for example, by injection molding. It will be recognized that the base 4 and cover 6 may also be formed as two separate pieces that snap together or otherwise interlock.

A pair of optional latches 42 (FIG. 4) each including a flexible cantilevered bar member 44 (FIG. 1) that snap fits over an aligned protrusion 46 (FIG. 1) are provided to maintain the frame 2 in its closed condition. Other conventional closures or mechanical fasteners such as hook and loop fasteners, elastic bands, locks, or the like may also be used.

The cover 6 may also optionally include transverse and/or longitudinal support bars (not shown) similar to those provided in the base 4 that serve to further retain the filter media 10 in the frame. Such support bars serve a safety function and prevent the filter media 10 from ballooning out of the frame in case the frame is inadvertently inserted backward in an air duct. When inserted backward, the filter will not perform properly because the media is not supported by the ribs 32 and will therefore tend to flatten in use, but the filter media will be retained in the frame 2 so that any damage to the system is avoided.

To ensure that the frame 2 is installed correctly in the air duct with the cover 6 upstream and the base 4 downstream so that air travels successively through the cover 6, the filter element 8, and the base 4, a visual indicator 47 is provided on the frame 2 showing the proper orientation of the frame relative to the direction of the air flow. Additional instructions may be provided to ensure the frame is properly arranged in the air duct.

Protrusions 48 provided in the first 16 and second 20 ends of the base 4 serve as securing mechanisms to attach the filter element 8 to the base 4 and retain the filter element 8 in its expanded condition when the filter element 8 is installed in the frame 2. Each protrusion 48 engages an aligned hole 50 contained in the first 18 and second 22 ends of the cover 6. Other suitable securing mechanisms include adhesive, hook and loop fasteners, clips, clamps, clasps, hooks, or the like.

The frame 2 is generally intended as a frame for a residential air filter for use in, for example, a furnace, a window air conditioning unit, or a kitchen range hood. Accordingly, the frame 2 generally has a depth or thickness of ½ inch to 5 inches, preferably between ¾ inch to 1 ¼ inches, and more preferably approximately an inch thick. The height of the frame 2 is generally between 5 inches and 24 inches, and preferably between 10 inches and 20 inches. The width of the frame is generally between 10 inches and 32 inches, and preferably between 20 inches and 30 inches.

To facilitate the installation and removal of the frame 2 from an air duct, indentations 52 are provided in the ends 16, 20 of the base 4 and side 26 of the cover 6. The indentations 52 are designed such that the filter frame 2 does not contain any holes that would allow air to bypass the filter media unfiltered. The indentations provide a narrow gripping region along the periphery of the frame that can be readily grasped by a user during the installation and removal process.

Referring now to FIGS. 6–8, there is shown the accordion pleated replaceable filter element 8 in greater detail. The filter element 8 includes reversibly collapsible and expandable filter media 10 having an inlet face 54 and an outlet face 56, and a non self-supporting inelastic spacing structure 14 arranged over the inlet face 54. The spacing structure 14 allows the filter element 8 to be quickly and easily expanded to a fixed spacing and inserted into the base 4.

This construction allows the filter element 8 to be collapsed to a compact form for shipping and storage and to later be easily re-expanded to a fixed spacing and attached to the frame 2. The spacing structure 14 is open and does not significantly restrict the air flow though the media 10. The spacing structure 14 is thin and flexible so it can fold in between the pleats 12 or outwardly away from the pleats 12 when the filter element 8 is collapsed into its compressed state as shown in FIG. 8. Suitable spacing structures 14 include scrims, screens, nets, or mesh structures, or the like, formed of, for example, metals, synthetic plastic materials or natural fibers such as cotton thread.

To ensure reliable uniform down web spacing and cross web stability, and to ensure easy handling of the filter element 8, the spacing structure 14 is preferably provided over the entire inlet face 54. If not provided over the entire inlet face 54, the spacing structure 14 is preferably provided over an interior face region 58 of the media 10. This may be accomplished, for example, by providing the spacing structure 14 in the form of one or more strips extending across the interior face region 58 of the media 10 arranged perpendicular to the direction of pleating and attached to successive pleats 12.

The expression "interior face region" refers to the area extending inwardly from the peripheral region of the media 10 adjacent the outer edge of the filter element 8 and includes the central area of the filter element 8. By providing the spacing structure at least in the interior face region 58 of the media 10, the filter element 8 is easy to expand to its full length while providing uniform spacing across the width of the filter media 10 and preventing over expansion.

The media 10 includes a plurality of pleats 12 each including a fold line 60 defining a pleat tip 62 and a pair of adjacent panels 64. Successive pleat tips on the inlet side 54 define a planar attachment surface to which the spacing structure 14 is attached. The spacing structure 14 is preferably adhesively bonded to the media 10 but other conventional attachment means such as heat lamination or ultrasonic welding may also be used.

The length 66 of the spacing structure 14 between successive pleat tips 62 forming the attachment surface is less than two times the length 68 of a panel 64 as measured from one pleat tip 62 to the next alternating pleat tip 62. In this manner, when the filter element 8 is fully expanded, the spacing structure 14 forms a generally planar structure and adjacent panels 64 form an angle a of less than 180 degrees.

The length of the spacing structure 14 between successive pleat tips 62 is preferably less than the length 68 of a panel 64 measured from one pleat tip 62 to the next alternating pleat tip 62, whereby adjacent panels 64 form an angle a of less than 60 degrees when the filter element 8 is in its fully expanded condition. To achieve equal and uniform spacing of the pleats 12, the length of the spacing structure 14 between each successive pleat tip 62 is the same.

The spacing distance between successive pleat tips 62 depends of the size of the filter but generally ranges from about 2 millimeters to about 40 millimeters. For most applications, however, the spacing distance between successive pleat tips 62 is preferably at least 5 millimeters and, more preferably, at least 8 millimeters.

Elongate attachment members 70 are provided along opposite ends 72, 74 of the filter element 8 parallel to the fold lines 60. The attachment members 70 preferably have a stiffness greater than the stiffness of the filter media 10. The attachment members 70 provide the ends 72, 74 of the filter element 8 with increased stiffness, thereby improving the handlability of the filter element 8 and allowing the filter element 8 to be expanded and collapsed easily and uniformly. In addition, the attachment members 70 provide the ends 72, 74 with increased strength and rigidity so that the filter element 8 can be quickly and easily attached to the base 4.

Optional holes 76 that mate with protrusions 48 are provided in the attachment members 70 and serve to attach the filter element 8 to the base 4 and maintain the filter element 8 in its expanded condition when the filter element 8 is placed in the base 4. Other conventional means for attaching the filter element 8 to the frame 2 such as pinching the attachment members 70 between the base 4 and cover 6, hook and loop fasteners, adhesive, clips, clamps or the like may also be used. The attachment members 70 may be formed of any suitable material including metal foils, paperboard, cardboard, chipboard, synthetic plastic materials including plastic film, or multiple layers of filter media laminated together.

While any pleated fibrous filter media may be used, a preferred filter media is an electrostatically charged media The media may be either relatively stiff and self-supporting or relatively soft and non self-supporting. By "self-supporting" it is meant that the media, with or without the spacing structure 14, generally maintains its shape when subjected to an air stream Thus, whether the media is self-supporting or not depends on the physical properties of the media itself, the geometry or construction of the media, and the conditions to which the media is subjected in a particular end use application.

Generally, a stiff self-supporting media has a Gurley stiffness of greater than 50 milligrams for a sample size having a width of 2 inches and a length of 1.5 inches, preferably greater than 100 milligrams for such a sample size, and a soft non self-supporting media has a Gurley stiffness of less than 30 milligrams for a sample size having a width of 2 inches and a length of 1.5 inches. For media having stiffness values between these values, whether the media is self-supporting depends on the construction of the media and on the end use application.

If the media is self-supporting, the support ribs 32 may not be required because the media will maintain its shape when subjected to the air stream. On the other hand, if the media is non self-supporting, ribs 32 are needed to support and space the media when the filter element is placed in an air stream to prevent the pleats 12 from bowing or collapsing.

A generally self-supporting filter media is Accuair 2.0 ounce per square yard filter media available from Kimberly Clark Corporation, Neenah, Wis. having a Gurley stiffness of approximately 120 milligrams for a sample size having a width of 2 inches and a length of 1.5 inches. A non self-supporting filter media is Filtrete GCB 40 filter media available from 3M Company, St. Paul, Minn. having a Gurley stiffness of approximately 15 milligrams for a sample size having a width of 2 inches and a length of 1.5 inches. A suitable spacing structure is a reinforcing fabric available from Bayex Inc., Albion, N.Y. under the product number DPM 4410 P3A2-24. This product is an open scrim having four strands per inch of 70 denier polyester thread. The scrim is provided with a thermoplastic adhesive that allows the scrim to be heat laminated directly to the filter media.

To install the filter element 8 into the frame 2, the frame 2 is placed on a surface so that the base 4 is beneath the cover 6. The frame 2 is then opened as shown in FIG. 1 by releasing the latches 44 and pivoting the cover 6 upwardly away from the base 4. The filter element 8 is then fully expanded by first orienting the filter element 8 so the scrim 14 facing up, and then grasping the attachment members 70 and separating them until the scrim 14 is flat and the pleats are evenly spaced. The filter element 8 is then placed in the base 4 so that pleat opening on the bottom of the filter element 8 mesh with the ribs 32. The holes 76 in the attachment member 70 are then placed on the protrusions 48 to attach the filter element 8 to the base 4. The cover 6 is then closed to retain the filter element 8 in place, and the latches 44 are re-connected to lock the cover with the base 4. Constructed in this manner, the media 10 is supported from the back which allows the dirty side of the media to be facing up when changing the filter element 8, thereby resulting in less mess. The filter element 8 is removed from the frame 2 by reversing the above steps.

It will be recognized that the filter element 8 may be attached to the cover 6 rather than the base 4. In this manner, the ribs 32 move into the pleats 12 as the frame 2 is closed. This, however, is less desirable because the pleats 12 may require slight manipulation to properly mesh with the ribs 32, and the dirty filter element will be laying with the dirty side facing down during replacement. This, in turn, will produce a mess that must be cleaned up.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A reusable filter frame for use with a replaceable pleated filter element, said frame comprising a base having a perimeter structure and a plurality of transverse ribs connected with said perimeter structure adapted to mesh with the filter pleats, said frame including a securing mechanism comprising at least one projection on said base for attaching the filter element to the frame and retaining the filter element in its expanded condition.

2. A reusable filter frame as defined in claim 1, further comprising a cover arranged on said base, said cover containing at least one hole that mates with said at least one projection on said base.

3. A reusable filter frame as defined in claim 1, further comprising a removable cover operatively associated with said base, said cover including a perimeter structure defining a center opening free of obstruction to allow air to flow through the filter element.

4. A reusable filter frame for use with a replaceable pleated filter element, said frame comprising a base having a perimeter structure defining a central area and a plurality of transverse ribs connected with said perimeter structure adapted to mesh with the filter pleats and a plurality of longitudinal rails extending across said central area, wherein said longitudinal rails include spacing portions adapted to mesh with the filter pleats.

5. A reusable filter frame for use with a replaceable pleated filter element, said frame comprising:

(a) a base having a perimeter structure defining a central area and a plurality of transverse ribs connected with said perimeter structure adapted to mesh with the filter pleats and a plurality of longitudinal rails extending across said central area, and (b) a removable cover operatively associated with said base, said cover including a perimeter structure defining a central opening free of obstruction to allow air to flow through the filter element.

6. A reusable filter frame for a residential heating and cooling system adapted to receive a replaceable, reversibly collapsible and expandable pleated filter element, said frame comprising:

(a) a base including a perimeter structure, a plurality of longitudinal rails arranged within said perimeter structure, and a plurality of transverse ribs adapted to mesh with an equal number of filter pleats; and (b) a cover hingably connected with said base, said cover containing a central opening free of obstructions for allowing air to flow through the filter element;

said frame comprising a unitary structure molded from a synthetic plastic material, said frame including a securing mechanism comprising aligned projections and holes provided in said base and said cover for attaching the filter element to the frame and retaining the filter element in its expanded condition, and a closure for maintaining the frame in a closed condition.

* * * * *